No. 869,558. PATENTED OCT. 29, 1907.
G. W. DURBROW.
SUBMERGED FILTER.
APPLICATION FILED NOV. 8, 1904.
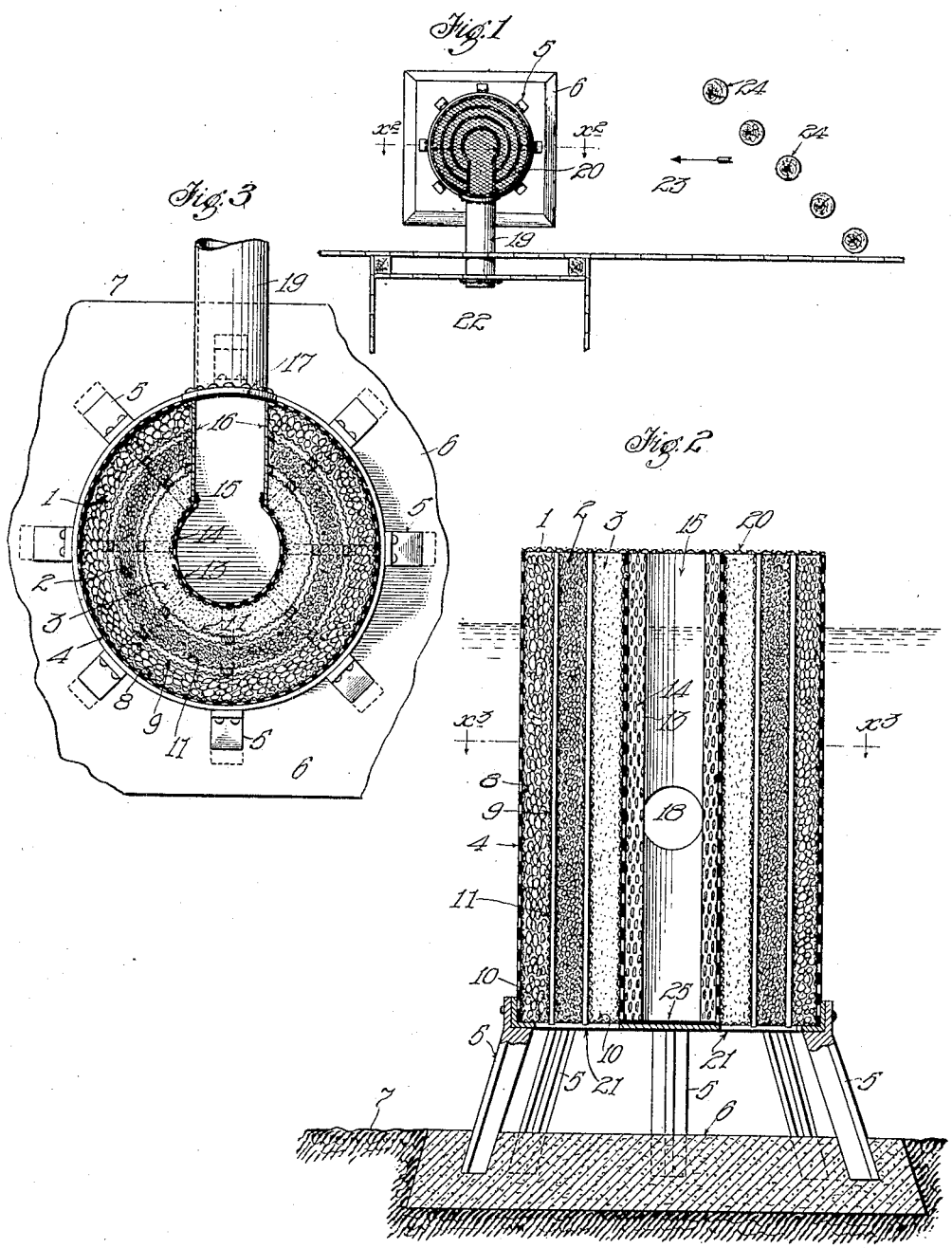
Witnesses
Inventor
George W. Durbrow
By Townsend Bros
His Attys

UNITED STATES PATENT OFFICE.

GEORGE W. DURBROW, OF INDIO, CALIFORNIA, ASSIGNOR TO DURBROW FILTRATION COMPANY, OF YUMA, ARIZONA TERRITORY, A CORPORATION OF ARIZONA TERRITORY.

SUBMERGED FILTER.

No. 869,558.  Specification of Letters Patent.  Patented Oct. 29, 1907.

Application filed November 8, 1904. Serial No. 231,831.

*To all whom it may concern:*

Be it known that I, GEORGE W. DURBROW, a citizen of the United States, residing at Indio, in the county of Riverside and State of California, have invented a new and useful Submerged Filter, of which the following is a specification.

This invention relates to a submerged filter which is designed for use in irrigation systems and which may be employed in water works for municipalities or for private use, and the object of the invention is to provide a filter of this character which is very effective in operation, simple in construction, durable in use and which is self-cleaning.

Other advantages of the invention will appear from the following detailed description.

The accompanying drawings illustrate the invention and referring thereto: Figure 1 is a plan view of the filter. Fig. 2 is a vertical sectional view taken diametrically through the filter. Fig. 3 is a transverse section through the filter taken on line $X^3$—$X^3$ in Fig. 2.

In the form shown in Figs. 1, 2, and 3, the filter comprises a series of segmental concentric layers of gravel, 1, 2, and 3, of varying degrees of fineness, the layer 1 being preferably of coarse gravel, which will pass through, for example, a one-half inch mesh, the layer 2 being of finer gravel, which will pass through a one-eighth inch mesh, for example, and the layer 3 being of a grade which will pass through a one-sixteenth inch mesh, for example.

The outer layer 1 is nested within a segmental casing 4, which may preferably be formed of galvanized sheet iron, the casing 4 having an open bottom and being supported by legs 5 mounted in masonry 6, placed in the bed 7 of the stream. The casing 4 is also open at the top. The outermost stratum 1 is confined in a segmental sack or cage comprising an outer galvanized iron screen 8 and an inner screen 9 of similar construction, the screens 8 and 9 being united at the bottom by a screen 10.

The stratum 2 is confined within a similar sack and the external diameter of the casing 11 surrounding the stratum 2 is somewhat less than the inner diameter of the screen 9 so that a space is formed between the strata 1 and 2. The inner stratum is confined within a wire sack similar to the sack 11 and its outside diameter is slightly less than the inside diameter of sack 11, and thus forms a space similar to that which exists between the two outer strata 1 and 2. The inner sack of this stratum 3 is vertically supported by a segmental casing 13, which is provided with perforations 14. As the gravel layers and cages are segmental a radially disposed passage-way 15 is formed which extends from the inner casing 13 to the outer casing 4 with side plates 16, as shown in Fig. 3. At one end the plates 16 are riveted to the inner casing 13, and at the other end to a segmental plate 17. The plates 17 fill the gap in the outer segmental casing 4. The plate 17 has an outlet 18 which communicates with a pipe 19, the pipe 19 serving to conduct the filtered water away from the filter to the irrigating ditch.

The top of the filter is preferably covered by a screen 20. Cross bars 21 extend across the bottom of the casing 4 and serve to hold the nested layers of gravel with their cages in place within the casing 4.

The filter may be arranged as shown in Fig. 1, with the pipe 19 discharging into the ditch 22, the filter being placed vertically in the stream or main supply canal 23.

Some piles 24 may be driven into the bed of the stream at some distance above the filter and so arranged as to prevent logs or other drift from floating down against the filter.

The bottom of the inner casing 13 is closed by a plate 25, and it will thus be seen that water from the main supply canal will largely enter the inner casing 13 by first percolating through the gravel strata 1, 2, and 3. The water in its passage through the gravel strata 1, 2, and 3 has its velocity greatly diminished, and the silt or sediment in the water is deposited in the gravel and finds its way into the spaces between the gravel strata and gradually sinks down therethrough and out of the open bottom.

The water from the gravel strata percolates through the perforations of casing 13 and from the casing 13 it flows through the pipe 19 free from silt or other sediment.

It will thus be seen that the filter is self-cleaning as the silt or other sediment works its way down through the free spaces between the gravel strata, being washed out by the water.

The gravel strata may at any time, be bodily removed for cleaning by lifting out the wire cages from the casing.

The opening 18 in the inner casing may be stopped up if desired, and water which accumulates therein may be pumped from the inner casing 13.

It is obvious that as the water flows through the outlet from the filter it must be supplied from water above the level of such outlet, and that this must flow through all the strata, except such water as might be supplied at the open ends between the strata. The end openings are of comparatively small cross-sectional area so that their capacity for water passage is not sufficient to supply the vacuum caused by the outflow. Consequently, the water is supplied through all the strata. In cases where the open spaces are vertical, sediment which may settle from the water therein will drop out at the bottom thereof, and the denser character thus given to the liquid into which the sediment settles materially adds to the prevention of upflow of water in such intermediate open spaces.

What I claim is:—

1. A filter composed of a series of concentric sections of filtering material and sacks of netting inclosing the respective sections, narrow open bottom spaces being provided between the sections.

2. A filter composed of a series of concentric sections of filtering material, sacks of netting inclosing the respective sections, and means for supporting said sections so as to provide open bottom spaces between the sections.

3. A filter composed of a series of substantially concentric sections of filtering material arranged with open bottom spaces between the sections, a pervious casing inclosing the sides of the outer section, a pervious casing inside of the inner section, and an impervious bottom for the inner casing whereby the water from the supply canal must first pass through the filtering material before entering the interior of the inner casing.

4. A filter composed of a series of substantially concentric sections of filtering material arranged with open bottom spaces between the sections, a pervious casing inclosing the sides of the outer section, a pervious casing inside of the inner section, an impervious bottom for the inner casing whereby the water from the supply canal must first pass through the filtering material before entering the interior of the inner casing, and suitable cages of wire netting inclosing the respective sections.

5. A filter composed of a series of substantially concentric sections of filtering material arranged with open bottom spaces between the sections, a pervious casing inclosing the sides of the outer section, a pervious casing inside of the inner section, an impervious bottom for the inner casing whereby the water from the supply canal must first pass through the filtering material before entering the interior of the inner casing, and suitable cages of wire netting inclosing the respective sections, said filter being revolubly mounted.

In testimony whereof, I have hereunto set my hand at San Francisco California this 31st day of October 1904.

GEORGE W. DURBROW.

In presence of—
ALFRED A. ENQUIST,
W. A. TOLCHARD.